(No Model.)
L. L. BURDON.
METHOD OF MAKING INGOTS FOR SEAMLESS PLATED WIRE.
No. 419,598. Patented Jan. 14, 1890.
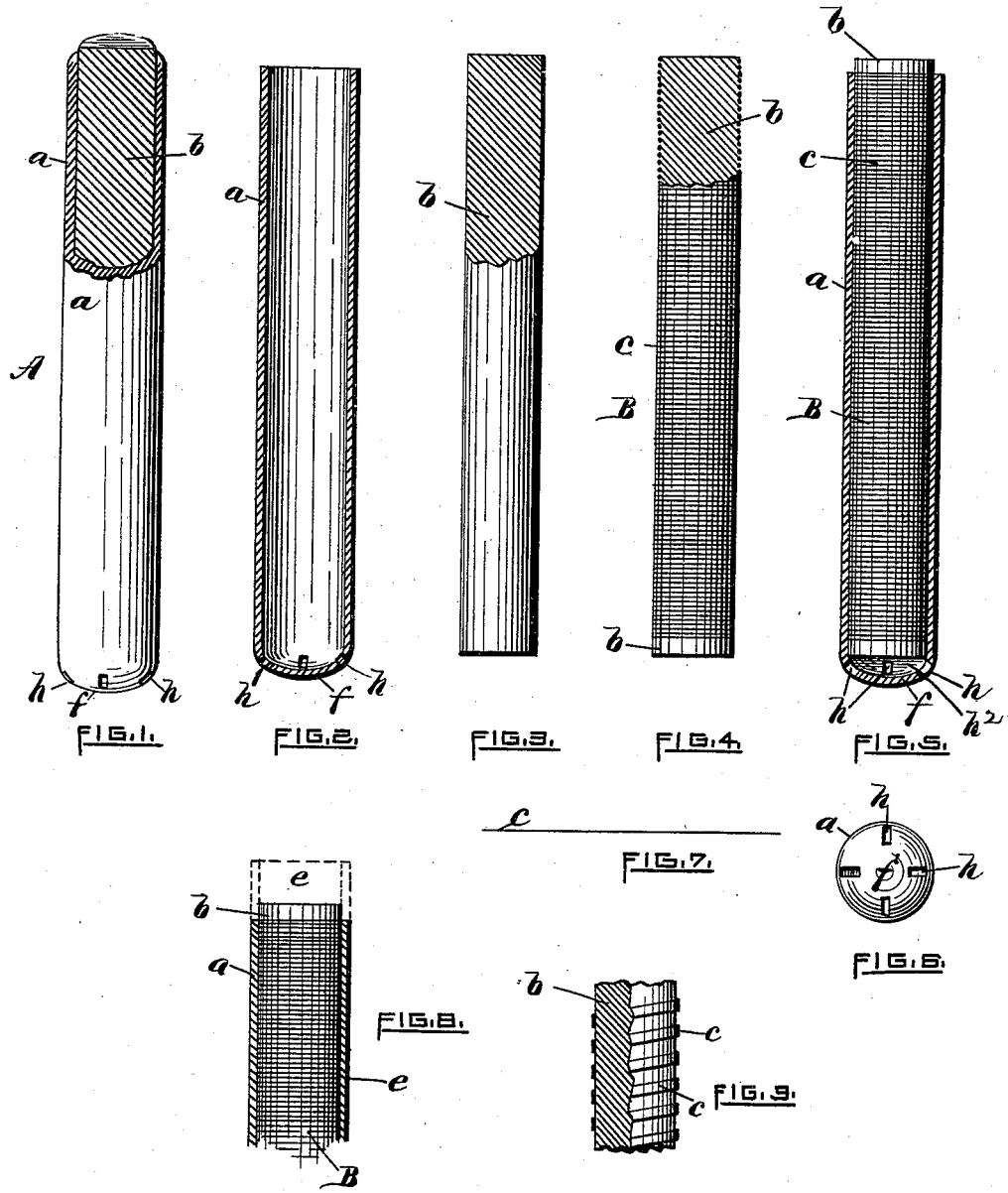

UNITED STATES PATENT OFFICE.

LEVI L. BURDON, OF PROVIDENCE, RHODE ISLAND, ASSIGNOR TO THE BURDON SEAMLESS FILLED WIRE COMPANY, OF SAME PLACE.

METHOD OF MAKING INGOTS FOR SEAMLESS PLATED WIRE.

SPECIFICATION forming part of Letters Patent No. 419,598, dated January 14, 1890.

Application filed June 28, 1889. Serial No. 315,895. (No model.)

*To all whom it may concern:*

Be it known that I, LEVI L. BURDON, a citizen of the United States, residing at Providence, in the county of Providence and State of Rhode Island, have invented certain new and useful Improvements in Manufacture of Ingots for Producing Seamless Plated Wire; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the manufacture of cylindrical compound ingots adapted to be reduced into seamless plated wire it is practically found to be somewhat difficult to obtain a complete union of the core with the outer shell or plating of fine metal. This result is in a great measure due to the fact that the solder employed is in the first place unequally disposed within the ingot—that is, before the latter is subjected to the action of heat for the purpose of effecting the union of the parts.

The object I have in view is to overcome the disadvantage above referred to. To that end I wind upon the surface of the core a layer of solder in the form of fine wire, the core when thus covered resembling somewhat the surface of a spool of thread, or even that of a piece of large wire covered with fine thread or silk. In thus winding the core with a wire or thread of soldering metal the convolutions are preferably made to touch each other, thus forming a "close wind." By means of this manner of preparing the core a certain degree of elasticity is produced upon introducing the core into a fine-metal seamless shell or casing of proper size. Another resulting advantage is that the solder when thus reduced to the form of wire will be for a given size or number not only exactly equal in diameter throughout its length, but also uniform in quality. Experimental tests have shown that solder when in the form of wire fuses more readily and forms a more perfect union of the core and shell when properly subjected to heat than ingots soldered by other processes.

In the appended drawings, Figure 1 represents a perspective view, in partial section, of my soldered ingot having a base-metal core and a seamless shell or outer casing of fine metal, as gold. Fig. 2 is a longitudinal central sectional view of the outer shell having a closed end. Fig. 3 is a side elevation, in partial section, of the base-metal core before being wound with solder-wire. Fig. 4 is a similar view of the core after being wound with the solder-wire. Fig. 5 is a longitudinal central sectional view of the gold shell, having the wire-covered core inserted therein ready to be subjected to an oven or furnace to fuse the solder. Fig. 6 is an inverted end view of the parts shown in Fig. 5. Fig. 7 indicates a piece of fine wire made of solder. Wire of this character is represented in Figs. 4 and 5. Fig. 8 is a partial longitudinal sectional view of the upper portion of the ingot before soldering, showing an extension of the outer shell to form a chamber; and Fig. 9 shows a section of an ingot wound with flat wire.

The parts more in detail and the manner of their construction may be described as follows:

A indicates the compound ingot as soldered and ready to be reduced into seamless plated wire.

*a* designates the seamless outer shell or casing of the ingot. The shell is usually made of fine metal, as gold, suitably alloyed, and may be formed from a blank or disk by a series of suitable dies and plungers having progressively-decreasing diameters, as usual, until finally it reaches the form shown in Fig. 2; or it may be slightly conical or tapering from end to end. I prefer to leave an end *f* of the shell closed and somewhat convex, through which a series of small openings *h* are made, as clearly represented.

*b* indicates the base-metal core, the same being substantially of the form and length as the shell *a*. Its diameter, however, is somewhat less than the interior diameter of the shell.

*c* indicates the solder employed, which in fusing unites the said shell to the core. The solder may be made of suitably-alloyed silver, although alloys adapted to fuse at lower temperatures may be successfully substituted. The solder is first melted and cast in the usual manner and rolled into sheet form, after which it is cut longitudinally into narrow strips. These, in turn, after being properly annealed, are repeatedly passed through a "draw-plate," thereby reducing the strips to the form of wire. The finished size of such wire is governed somewhat by the nature of the metals to be united, as well as the diameter of the ingot. I have found that the wire-solder, when drawn down to a size corresponding to No. 30 Brown & Sharpe wire-gage, is well adapted for ingots having a diameter of about one inch. Instead of reducing the solder to a round-wire form, I may first reduce the sheet or strips to the desired thickness, and then cut it into narrower flat strips, which are next wound spirally around the core, as shown in Fig. 9.

The steps employed in making my improved ingot are as follows: The surface of the core *b* is covered with borax or otherwise suitably prepared, and then closely wound throughout its length with a layer of the fine-wire solder *c*, the wire being secured at the ends of the core. Another coating of borax may now be applied to the wound core B, and the whole inserted snugly within the tube *a*, the interior surface thereof having been previously prepared with borax. The parts when thus brought together are represented in Fig. 5, a small chamber $h^2$ being formed at the bottom of the core. The next step consists in subjecting the parts to the action of heat having a temperature sufficient to fuse the solder *c*. This may be effected by placing the unsoldered ingot in a vertical position, or even at a suitable angle, within a properly-heated furnace and gradually revolving the ingot until the fusing of the solder is effected. This is made apparent when the molten solder issues from the openings *h*, formed in the lower end of the ingot. After the removal of the soldered ingot A from the furnace it may be reduced to wire by successively passing it between a series of suitably-operated dies, the wire thus produced being seamless-plated.

In some cases the shell *a* may be somewhat longer than the core, the shell extending beyond the upper end of the core, as indicated by dotted lines in Fig. 8, and forming a small chamber *e*, which may be used as a reservoir in which loose solder may be placed to supply any deficiency due to the escape of molten solder from the lower end of the ingot. This is more particularly advantageous in case the bottom end *f* of the shell is omitted.

In lieu of the solid core *b*, one having a central longitudinal opening therein may obviously be used without departing from the spirit of my present invention.

In Fig. 9 the core *b* is represented as wound with solder in the form of narrow flat wire, the winding being such that the several convolutions are separated from each other by a narrow space, although the solder may be closely wound spirally, as before described. Upon subjecting the open-wound ingot to a proper heat the solder fuses and fills the intermediate spaces or interstices, thereby uniting the outer shell *a* to the core.

What I claim is—

1. The hereinbefore-described process of making compound ingots, which consists in preparing the surface of the base-metal core to receive solder, winding the core with solder drawn into the form of wire or narrow strips, inserting the said solder-covered core within the suitably-prepared seamless metallic tube, and then subjecting the whole to the action of heat sufficient to fuse the solder, substantially as set forth.

2. The hereinbefore-described process of making compound ingots, which consists in winding the suitably-prepared surface of the base-metal core with solder drawn into the form of fine wire, inserting the thus covered core within the prepared seamless metallic tube having an apertured end and forming a small chamber $h^2$ at the bottom of the ingot, and, finally, subjecting the whole to the action of heat sufficient to fuse the solder, substantially as set forth.

3. The hereinbefore-described process of making compound ingots adapted to be reduced into seamless plated wire, which consists in winding the suitably-prepared surface of the base-metal core with solder drawn into the form of fine wire, inserting the said wire-covered core within the prepared seamless metallic tube, subjecting the unsoldered ingot to the action of heat to fuse the solder, at the same time slowly revolving the ingot, after which it is susceptible of being drawn down or reduced to the required size.

4. The hereinbefore-described process of making compound ingots, which consists in winding the suitably-prepared surface of the base-metal-core wire with solder drawn into the form of fine wire or narrow strips, inserting the said wire-covered core within the prepared seamless metallic tube and forming a chamber, as *e*, at the upper end of the ingot to receive loose solder, and then subjecting the whole to the action of heat to fuse the solder, substantially as set forth.

In testimony whereof I have affixed my signature in presence of two witnesses.

LEVI L. BURDON.

Witnesses:
CHARLES HANNIGAN,
GEO. H. REMINGTON.